US012119560B2

(12) United States Patent
Chen et al.

(10) Patent No.: US 12,119,560 B2
(45) Date of Patent: Oct. 15, 2024

(54) PHASE SHIFTER, ANTENNA CIRCUIT AND ANTENNA DEVICE

(71) Applicant: AU Optronics Corporation, Hsin-Chu (TW)

(72) Inventors: Shih-Yuan Chen, Hsin-Chu (TW); Hsiu-Ping Liao, Hsin-Chu (TW); Yi-Chen Hsieh, Hsin-Chu (TW); Chun-I Wu, Hsin-Chu (TW); Chuang-Yueh Lin, Hsin-Chu (TW); Yi-Hsiang Lai, Hsin-Chu (TW); Ching-Huan Lin, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 324 days.

(21) Appl. No.: 17/842,125

(22) Filed: Jun. 16, 2022

(65) Prior Publication Data

US 2023/0163459 A1 May 25, 2023

(30) Foreign Application Priority Data

Nov. 19, 2021 (TW) ................................ 110143251

(51) Int. Cl.

*H01Q 3/30* (2006.01)
*H01Q 1/38* (2006.01)
*H01Q 1/42* (2006.01)
*H01Q 21/06* (2006.01)

(52) U.S. Cl.

CPC ................. *H01Q 3/30* (2013.01); *H01Q 1/38* (2013.01); *H01Q 1/422* (2013.01); *H01Q 21/065* (2013.01)

(58) Field of Classification Search

CPC ............ H01Q 3/30; H01Q 1/38; H01Q 1/422; H01Q 21/065; H01Q 21/00; H01Q 3/36; H01P 1/184; H01P 1/18

See application file for complete search history.

(56) References Cited

U.S. PATENT DOCUMENTS

| | | | | |
|---|---|---|---|---|
| 2020/0185386 | A1* | 6/2020 | Yamazaki | H01L 29/78648 |
| 2020/0266553 | A1* | 8/2020 | Cao | H01Q 21/065 |
| 2020/0343634 | A1* | 10/2020 | Wang | H01P 5/12 |
| 2021/0028545 | A1 | 1/2021 | Choi | |
| 2021/0083379 | A1 | 3/2021 | Cao | |
| 2021/0265744 | A9 | 8/2021 | Cao | |

OTHER PUBLICATIONS

Goelden, F. et al., Tunable liquid crystal phase shifter for microwave frequencies, Electronics Letters, vol. 45, No. 13, Jun. 18, 2009.

* cited by examiner

*Primary Examiner* — David E Lotter
(74) *Attorney, Agent, or Firm* — WPAT, P.C

(57) ABSTRACT

A phase shifter is provided, which includes a first substrate, a second substrate, a liquid crystal layer, a plurality of first ring-shaped electrodes and a plurality of second ring-shaped electrodes. The first substrate and the second substrate are disposed opposite to each other. The liquid crystal layer is disposed between the first substrate and the second substrate. The plurality of first ring-shaped electrodes are disposed sequentially and in interval on a side of the first substrate close to the liquid crystal layer. The plurality of second ring-shaped electrodes are disposed sequentially and in interval on a side of the second substrate close to the liquid crystal layer. A plurality of vertical projections, projected by the plurality of first ring-shaped electrodes to the second substrate, and at least partially overlapped with the plurality of second ring-shaped electrodes, respectively.

20 Claims, 11 Drawing Sheets

PHASE SHIFTER, ANTENNA CIRCUIT AND ANTENNA DEVICE

CROSS-REFERENCE TO RELATED APPLICATION

This application claims priority to Taiwan Application Ser. No. 110143251, filed Nov. 19, 2021, which is herein incorporated by reference in its entirety.

BACKGROUND

Field of Invention

The present disclosure relates to a phase array antenna technology. More particularly, the present disclosure relates to a phase shifter of changing a rotation angle of a liquid crystal to adjust a phase of a radio frequency signal, a related antenna circuit, and an antenna device.

Description of Related Art

The array antenna can change its beam synthesis mode through electronic components, thereby adjusting the scanning direction. Compared with the antenna that rotates in a mechanical structure, the array antenna has the advantages of small size and high scanning rate. The key elements of an array antenna are the phase shifter and the antenna electrodes, and the phase shifter is used to feed the radio frequency signal into the antenna electrodes. By using a plurality of phase shifters to set a plurality of radio frequency signals to different phases, constructive interference of the plurality of radio frequency signals in a specific direction can be achieved, so that the scanning direction of the array antenna can be adjusted to the specific direction.

SUMMARY

The present disclosure provides a phase shifter. The phase shifter comprises a first substrate, a second substrate, a liquid crystal layer, a plurality of first ring-shaped electrodes, and a plurality of second ring-shaped electrodes. The first substrate and the second substrate are disposed opposite to each other. The liquid crystal layer is disposed between the first substrate and the second substrate. The plurality of first ring-shaped electrodes are disposed sequentially and in interval on a side of the first substrate which is close to the liquid crystal layer. The plurality of second ring-shaped electrodes are disposed sequentially and in interval on a side of the second substrate which is close to the liquid crystal layer. A plurality of vertical projections projected by the plurality of first ring-shaped electrodes on the second substrate are at least partially overlapped with a plurality of second ring-shaped electrodes respectively.

The present disclosure provides an antenna circuit. The antenna circuit comprises an antenna electrode, a first substrate, a second substrate, a liquid crystal layer, and a phase shifter. The first substrate and the second substrate are disposed opposite to each other. The liquid crystal layer is disposed between the first substrate and the second substrate. The phase shifter is configured to feed a radio frequency signal into the antenna electrode, and comprises a plurality of first ring-shaped electrodes and a plurality of second ring-shaped electrodes. The plurality of first ring-shaped electrodes are disposed sequentially and in interval on a side of the first substrate which is close to the liquid crystal layer. The plurality of second ring-shaped electrodes are disposed sequentially and in interval on a side of the second substrate which is close to the liquid crystal layer. A plurality of vertical projections projected by the plurality of first ring-shaped electrodes on the second substrate are at least partially overlapped with a plurality of second ring-shaped electrodes respectively.

The present disclosure provides an antenna device. The antenna device comprises a first substrate, a second substrate, a liquid crystal layer, and a plurality of antenna circuits. The first substrate and the second substrate are disposed opposite to each other. The liquid crystal layer is disposed between the first substrate and the second substrate. The plurality of antenna circuits are arranged in an antenna matrix having a plurality of rows and a plurality of columns. Each of the antenna circuit comprises an antenna electrode and a phase shifter. The phase shifter is configured to feed a radio frequency signal into the antenna electrode, and comprises a plurality of first ring-shaped electrodes and a plurality of second ring-shaped electrodes. The plurality of first ring-shaped electrodes are disposed sequentially and in interval on a side of the first substrate which is close to the liquid crystal layer. The plurality of second ring-shaped electrodes are disposed sequentially and in interval on a side of the second substrate which is close to the liquid crystal layer. A plurality of vertical projections projected by the plurality of first ring-shaped electrodes on the second substrate are at least partially overlapped with the plurality of second ring-shaped electrodes respectively.

One of the advantages of the above-mentioned phase shifter is that a circuit layout with a small area can make the radio frequency signal generate a phase shift with a wide range.

One of the advantages of the above-mentioned antenna circuit is that a circuit layout with a small area can make the radio frequency signal generate a phase shift with a wide range.

One of the advantages of the antenna device is that it is thin and has a wide scanning angle.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
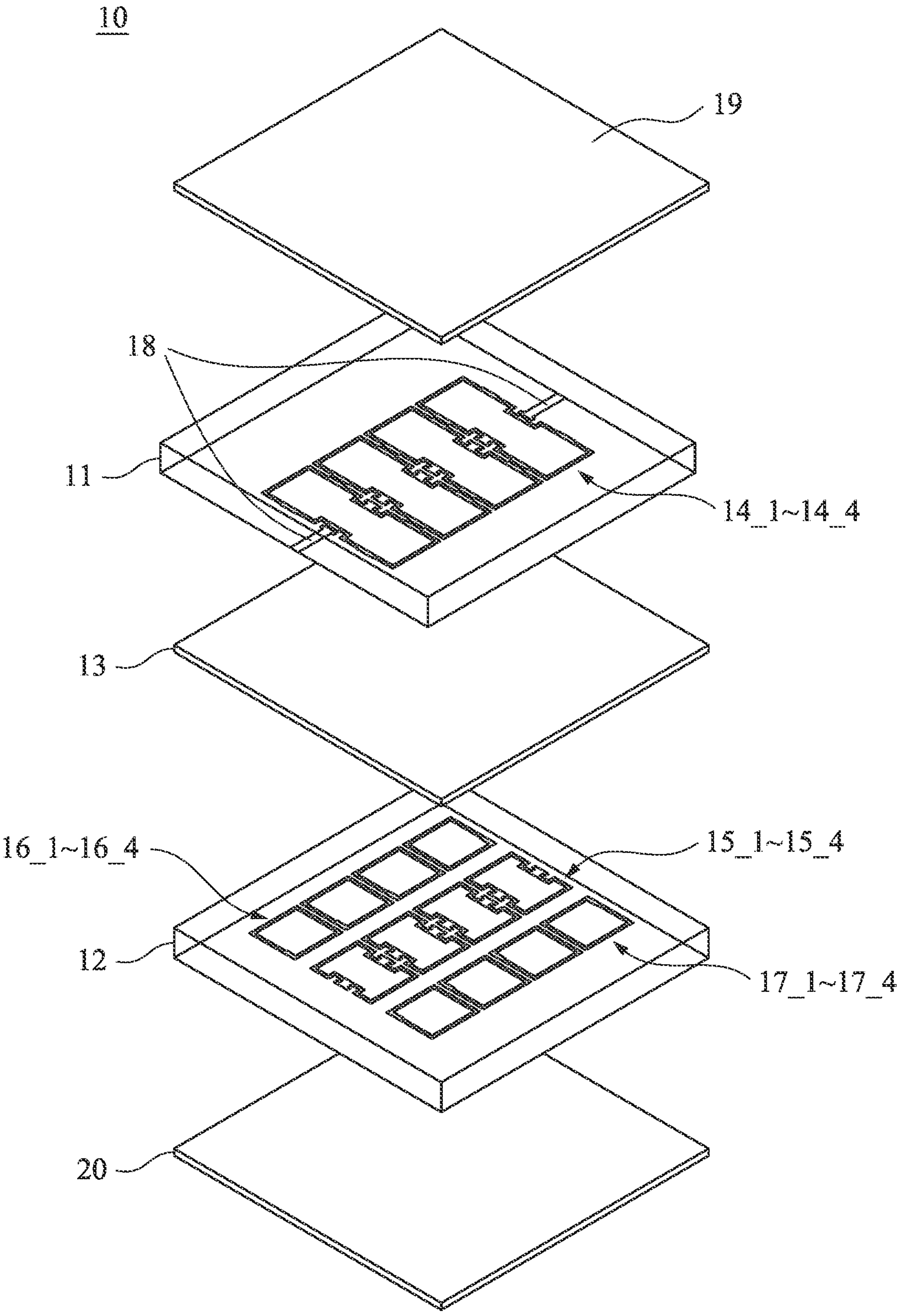
FIG. 1 is an exploded view of a phase shifter according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is an exploded view of a phase shifter 10 according to an embodiment of the present disclosure. The phase shifter 10 includes a first substrate 11, a second substrate 12, a liquid crystal layer 13, first ring-shaped electrodes 14_1~14_4, second ring-shaped electrodes 15_1~15_4, third ring-shaped electrodes 16_1~16_4, fourth ring-shaped electrodes 17_1~17_4, and a microstrip line 18. The first substrate 11 and the second substrate 12 are disposed opposite to each other, and the liquid crystal layer 13 is disposed between the first substrate 11 and the second substrate 12. The first ring-shaped electrodes 14_1~14_4 are disposed sequentially and in interval on a side of the first substrate 11 which is close to the liquid crystal layer 13. The second ring-shaped electrodes 15_1~15_4 are disposed sequentially and in interval on a side of the second substrate 12 which is close to the liquid crystal layer 13. The third ring-shaped electrodes 16_1~16_4 and the fourth ring-shaped electrodes 17_1~17_4 are disposed on a side of the second substrate 12 which is close to the liquid crystal layer 13, and the third ring-shaped electrodes 16_1~16_4 and the fourth ring-shaped electrodes 17_1~17_4 are respectively disposed on opposite sides of the second ring-shaped electrodes 15_1~15_4.

The microstrip line 18 is disposed on a side of the first substrate 11 which is close to the liquid crystal layer 13. The microstrip line 18 is used to transmit the radio frequency signal from the transmitter circuit (Tx, not shown) to the antenna electrode (such as the antenna electrode 95 in FIG. 9 described later) through the phase shifter 10. The first ring-shaped electrodes 14_1~14_4, the second ring-shaped electrodes 15_1~15_4, the third ring-shaped electrodes 16_1~16_4, and the fourth ring-shaped electrodes 17_1~17_4 are used to form an electric field to deflect the liquid crystal layer 130, thereby changing the dielectric constant of the liquid crystal layer 130, so as to change the phase of the radio frequency signal passing through the phase shifter 10.

In some embodiments, the phase shifter 10 further includes a first ground electrode 19 and a second ground electrode 20. The first ground electrode 19 is disposed on a side of the first substrate 11 away from the liquid crystal layer 13, that is the first ground electrode 19 and the first ring-shaped electrodes 14_1~14_4 are disposed on opposite sides of the first substrate 11. The second ground electrode 20 is disposed on a side of the second substrate 12 away from the liquid crystal layer 13, that is the second ground electrode 20 and each of the second ring-shaped electrodes 15_1~15_4, the third ring-shaped electrodes 16_1~16_4, and the fourth ring-shaped electrodes 17_1~17_4 is disposed on opposite sides of the second substrate 12.

In some embodiments, the first substrate 11 and the second substrate 12 can be made of suitable dielectric materials such as glass or ceramic materials.

In some embodiments, the first ring-shaped electrodes 14_1~14_4, the second ring-shaped electrodes 15_1~15_4, the third ring-shaped electrodes 16_1~16_4, and the fourth ring-shaped electrodes 17_1~17_4 can be realized by a composite coating of copper, aluminum, silver, titanium, molybdenum, chromium or the above metal materials; or the first ring-shaped electrodes 14_1~14_4, the second ring-shaped electrodes 15_1~15_4, the third ring-shaped electrodes 16_1~16_4, and the fourth ring-shaped electrodes 17_1~17_4 can also be realized by a conductive metal oxide material such as indium oxide (ITO), indium zinc oxide (IZO), or zinc oxide (ZnO).

Figure 2:
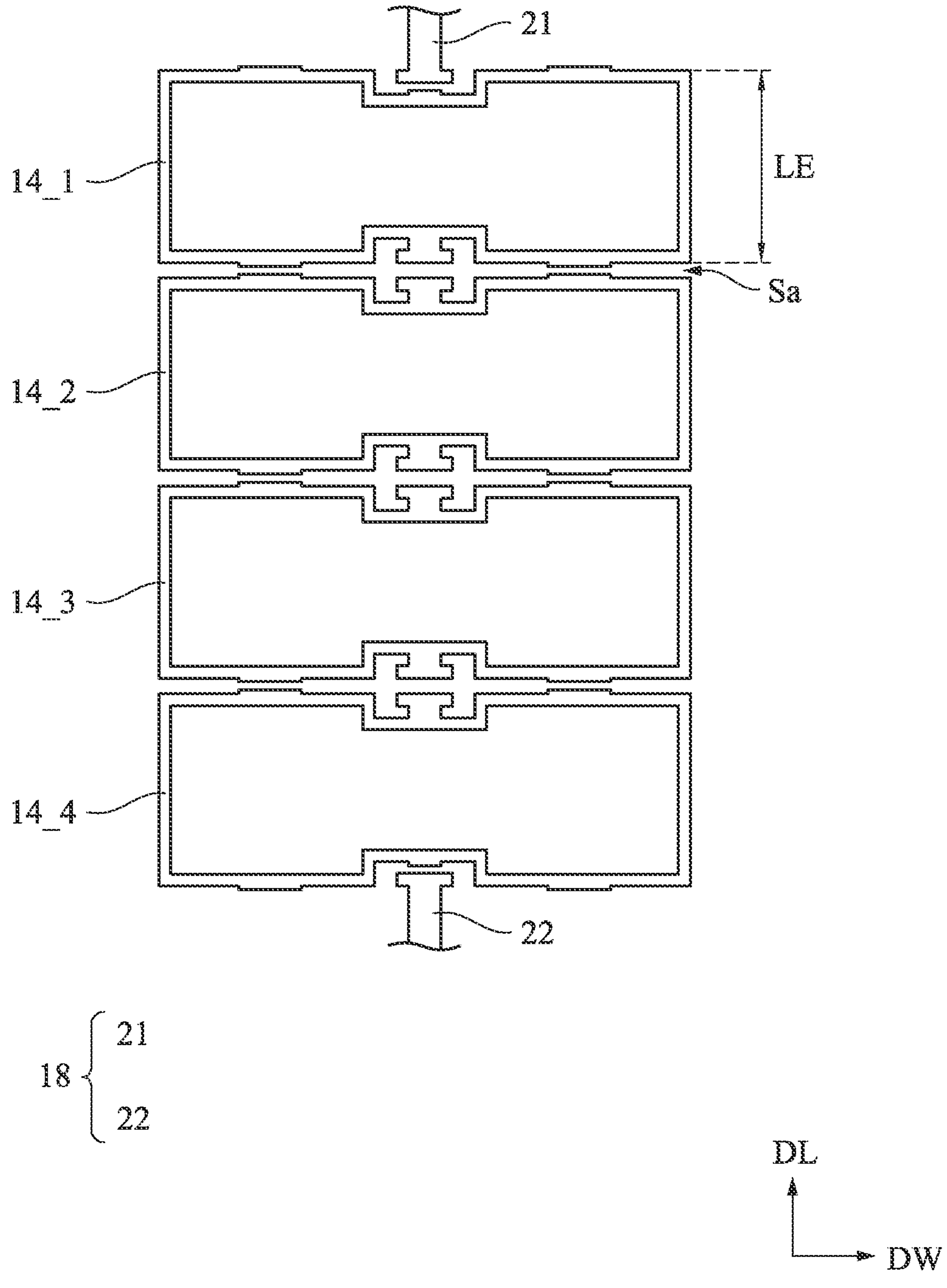
FIG. 2 is an enlarged schematic view of the microstrip line and the first ring-shaped electrode shown in FIG. 1.

FIG. 2 is an enlarged schematic view of the microstrip line 18 and the first ring-shaped electrodes 14_1~14_4 shown in FIG. 1. The microstrip line 18 includes a first conductive segment 21 and a second conductive segment 22, wherein the first conductive segment 21 and the second conductive segment 22 can have the same length direction DL and the width direction DW. In some embodiments, the first conductive segment 21 is used to receive the radio frequency signal from the transmitter circuit (Tx, not shown), and the second conductive segment 22 is used to feed the radio frequency signal to the antenna electrode (such as the antenna electrode 95 in FIG. 9 described later). The first ring-shaped electrodes 14_1~14_4 are sequentially arranged between the first conductive segment 21 and the second conductive segment 22 in the length direction DL. Any two adjacent ones of the first ring-shaped electrode 14_1~14_4 have a first distance Sa, that is the first ring-shaped electrodes 14_1~14_4 are DC insulated from each other, and can be arranged at the same interval. In some embodiments, the first distance Sa can be 10~20 μm.

There is a space between the first conductive segment 21 and the first ring-shaped electrode 14_1, and there is also a space between the second conductive segment 22 and the first ring-shaped electrode 14_4, that is the first conductive segment 21 and the second conductive segment 22 are not electrically connected to the first ring-shaped electrodes 14_1~14_4 directly. In other words, the first ring-shaped electrodes 14_1~14_4 are used to transmit an AC radio frequency signal from the first conductive segment 21 to the second conductive segment 22 under the condition that the first ring-shaped electrodes 14_1~14_4 are DC insulated from the first conductive segment 21 and the second conductive segment 22.

Figure 3:
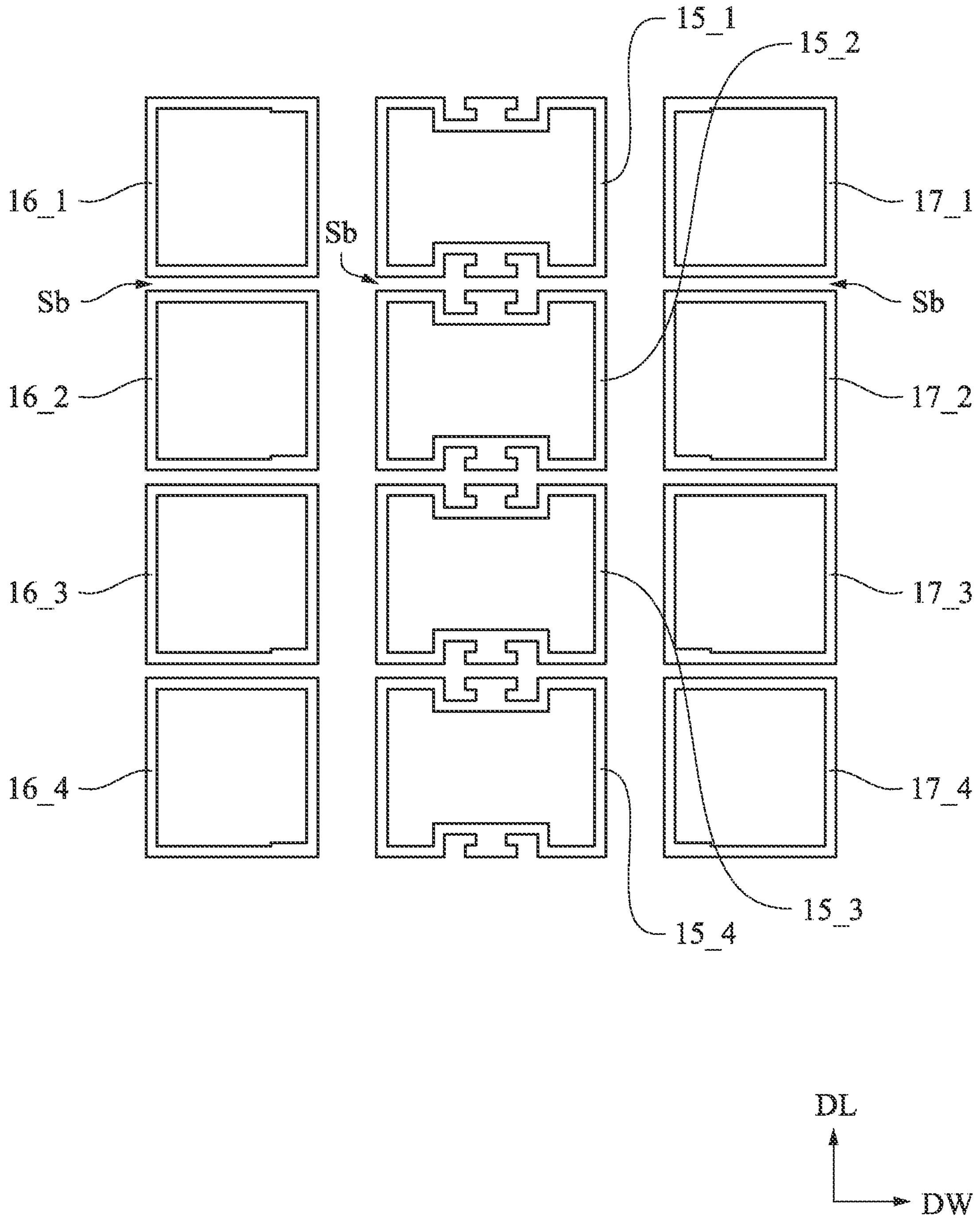
FIG. 3 is an enlarged schematic view of the second ring-shaped electrode, the third ring-shaped electrode, and the fourth ring-shaped electrode shown in FIG. 1.

FIG. 3 is an enlarged schematic view of the second ring-shaped electrodes 15_1~15_4, the third ring-shaped electrodes 16_1~16_4, and the fourth ring-shaped electrodes 17_1~17_4 shown in FIG. 1. The second ring-shaped electrodes 15_1~15_4 are arranged in sequence and at intervals in the length direction DL. Similarly, the third ring-shaped electrodes 16_1~16_4 and the fourth ring-shaped electrodes 17_1~17_4 are arranged in sequence and at intervals in the length direction DL. Any two adjacent ones of the second ring-shaped electrodes 15_1~15_4 have a second distance Sb, that is the second ring-shaped electrodes 150_1~150_4 are DC insulated from each other, and can be arranged at the same interval. Similarly, any two adjacent ones of the third ring-shaped electrodes 16_1~16_4 have the second distance Sb, and any two adjacent ones of the fourth ring-shaped electrode 17_1~17_4 have the second distance Sb. In some embodiments, the second distance Sb can be 10~20 μm.

The third ring-shaped electrodes 16_1~16_4 are respectively disposed on a first side (such as a left side) of the second ring-shaped electrodes 15_1~15_4 in the width direction DW. The fourth ring-shaped electrodes 17_1~17_4 are respectively disposed on a second side (such as a right side) of the second ring-shaped electrodes 15_1~15_4 relative to the first side in the width direction DW. For example, both sides of the second ring-shaped electrode 15_1 in the width direction DW are respectively adjacent to the third ring-shaped electrode 16_1 and the fourth ring-shaped electrode 17_1. For another example, both sides of the second ring-shaped electrode 15_2 in the width direction DW are respectively adjacent to the third ring-shaped electrode 16_2 and the fourth ring-shaped electrode 17_2, and so on.

Figure 4:
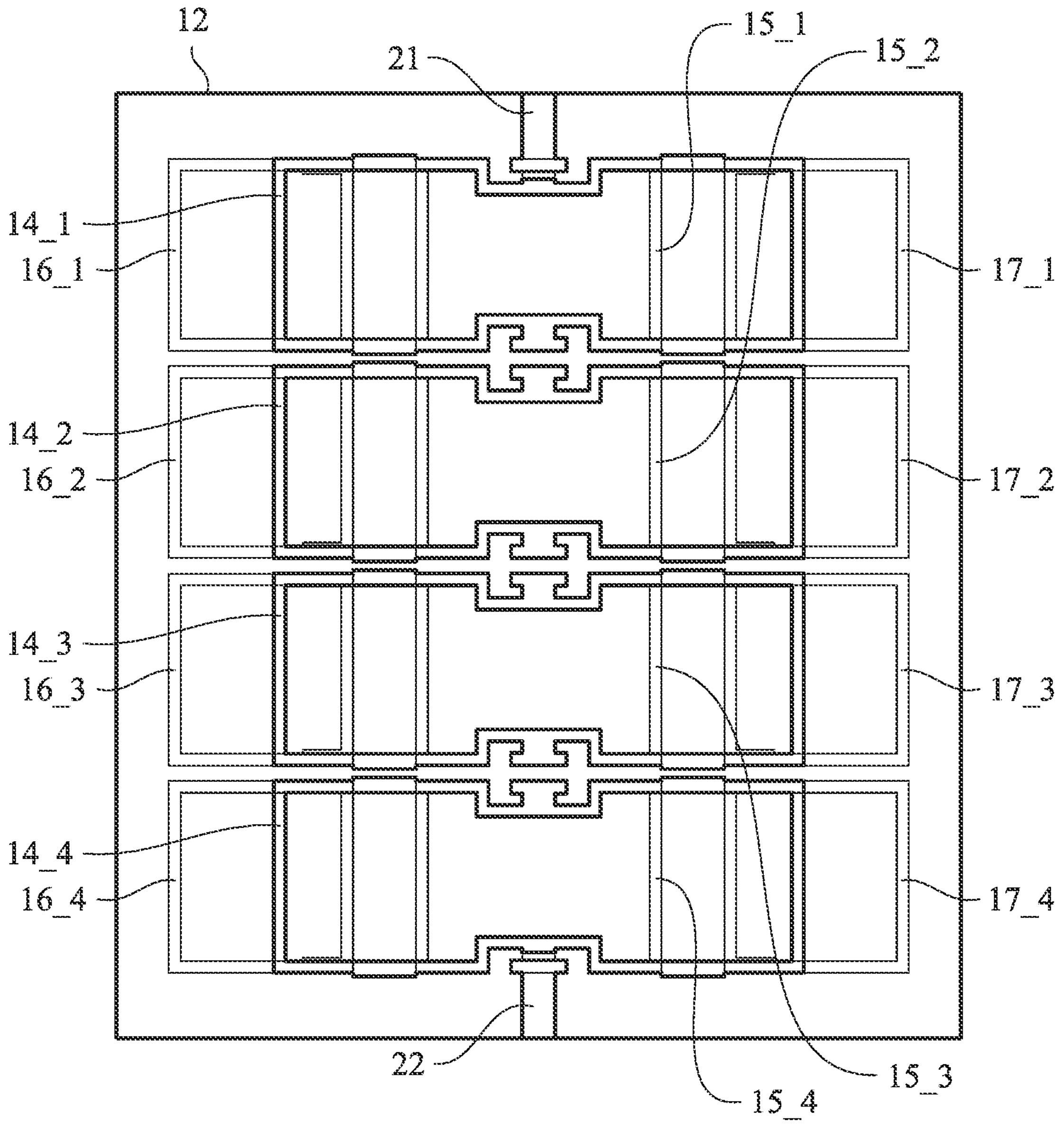
FIG. 4 is a schematic top view of the phase shifter shown in FIG. 1.

FIG. 4 is a schematic top view of the phase shifter 10 shown in FIG. 1. In order to simplify the drawing, FIG. 4 omits the first substrate 11, the liquid crystal layer 13, the first ground electrode 19, and the second ground electrode 20 in FIG. 1. A plurality of vertical projections projected by the first ring-shaped electrodes 14_1~14_4 on the second substrate 12 will be (1) at least partially overlapped with second ring-shaped electrodes 15_1~15_4 respectively, (2) at least partially overlapped with third ring-shaped electrode 16_1~16_4 respectively, and (3) at least partially overlapped with fourth ring-shaped electrode 17_1~17_4 respectively. For example, the vertical projection projected by the first ring-shaped electrode 14_1 on the second substrate 12 are at least partially overlapped with the second ring-shaped electrode 15_1, the third ring-shaped electrode 16_1, and the fourth ring-shaped electrode 17_1, and can not overlap other ring-shaped electrode. For another example, the vertical projection projected by the first ring-shaped electrode 14_2 on the second substrate 12 are at least partially overlapped with the second ring-shaped electrode 15_2, the third ring-shaped electrode 16_2, and the fourth ring-shaped electrode 17_2, and can not overlap other ring-shaped electrode, and so on.

The area of one ring electrode that overlaps with the other ring electrode forms a capacitive element in the phase shifter 10, and the part that does not overlap with the other ring electrode forms an inductive element in phase shifter 10. The dielectric constant of the liquid crystal layer 13 can be changed by changing the DC bias voltages received by the first ring-shaped electrodes 14_1~14_4, the second ring-shaped electrodes 15_1~15_4, the third ring-shaped electrodes 16_1~16_4, and the fourth ring-shaped electrodes 17_1~17_4, so as to change the capacitance value of the phase shifter 10, thereby changing the phase of the radio frequency signal passing through the phase shifter 10.

Figure 5:
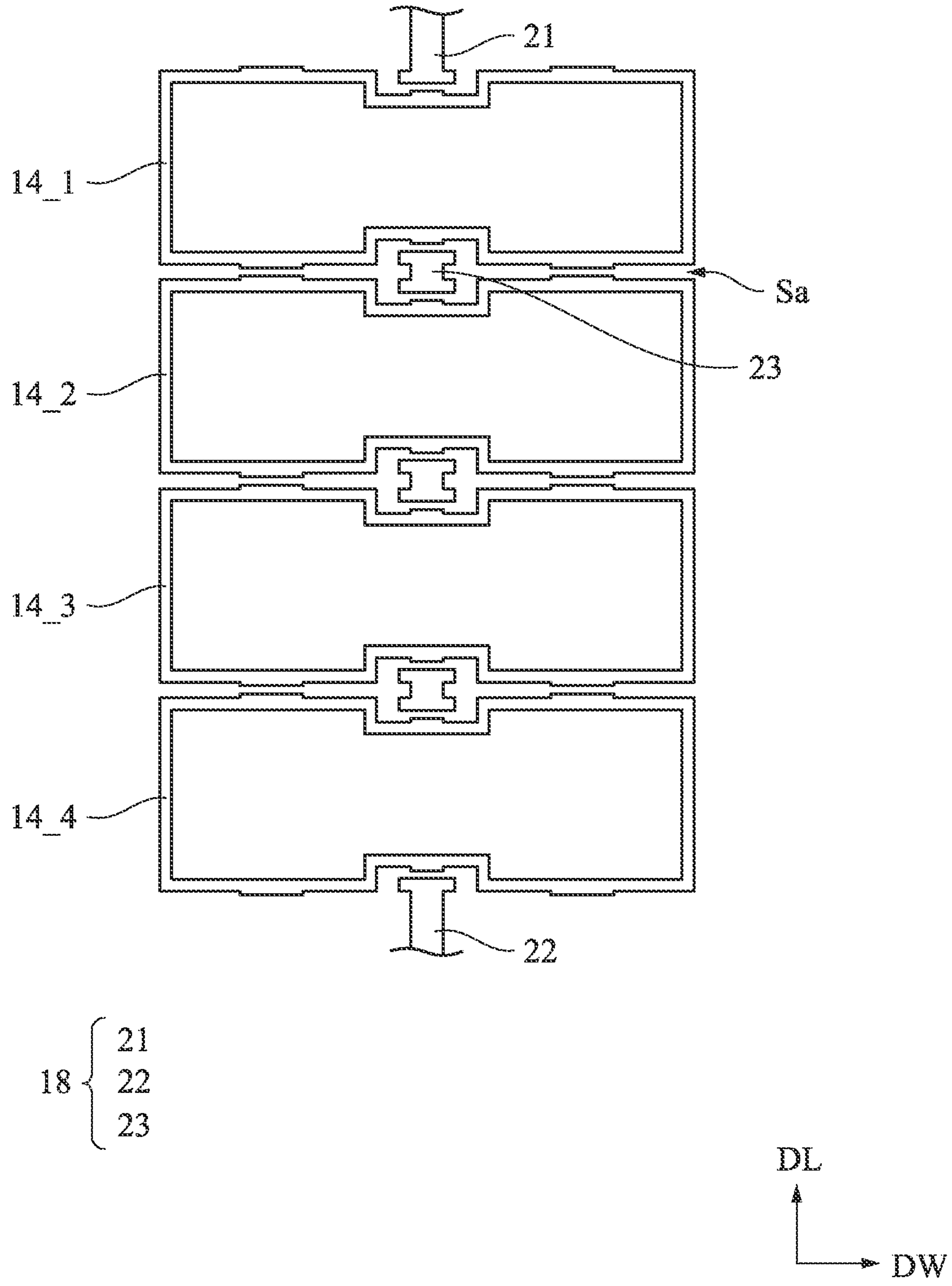
FIG. 5 is an enlarged schematic view of a microstrip line and a first ring-shaped electrode according to an embodiment of the present disclosure.

FIG. 5 is an enlarged schematic view of a microstrip line 18 and first ring-shaped electrodes 14_1~14_4 according to an embodiment of the present disclosure. The phase shifter 10 can includes the microstrip line 18 and the first ring-shaped electrodes 14_1~14_4, and includes the second ring-shaped electrodes 15_1~15_4, the third ring-shaped electrodes 16_1~16_4, and the fourth ring-shaped electrodes 17_1~17_4 in FIG. 3, that is the corresponding elements in FIG. 2 are replaced by the elements in FIG. 5. Since the embodiment of FIG. 5 is similar to the embodiment of FIG. 2, only the differences are described in detail below. In the embodiment shown in FIG. 5, the microstrip line 18 further includes a plurality of sub-electrodes 23 arranged in sequence in the length direction DL, and each sub-electrode 23 is disposed between two adjacent ones of the first ring-shaped electrodes 14_1~14_4. The plurality of sub-electrodes 23 are not electrically connected to the first ring-shaped electrodes 14_1~14_4 directly, that is the plurality of sub-electrodes 23 can be DC insulated from the first ring-shaped electrodes 14_1~14_4. In some embodiments, the plurality of sub-electrodes 23 and the first ring-shaped electrodes 14_1~14_4 are used to receive the same DC bias voltage.

The plurality of sub-electrodes 23 can flatten the forward transmission coefficient (S21) curve of the phase shifter 10 near the operating frequency of the radio frequency signal, so as to increase the bandwidth of the phase shifter 10.

Figure 6:
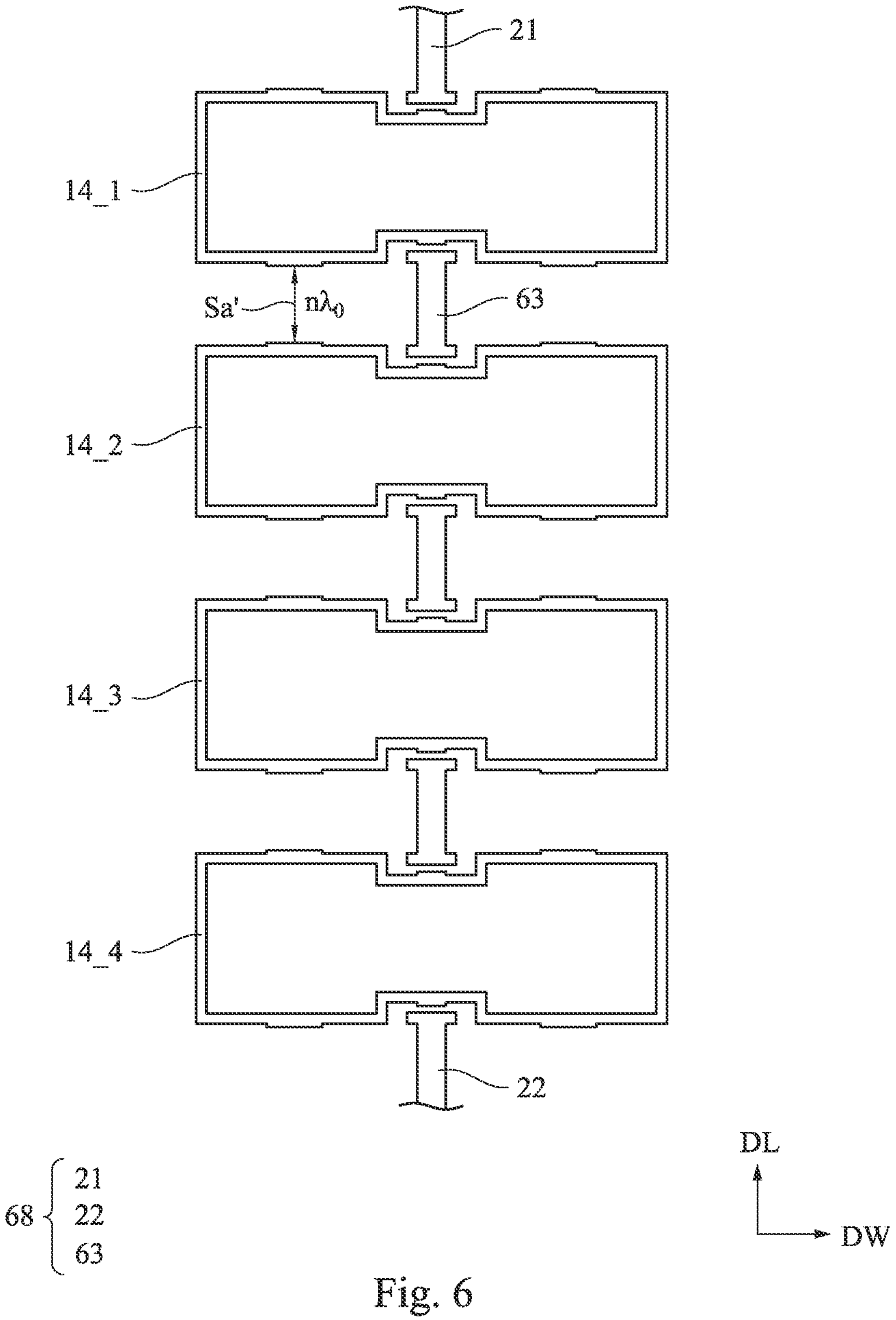
FIG. 6 is an enlarged schematic view of a microstrip line and a first ring-shaped electrode according to an embodiment of the present disclosure.
Figure 7:
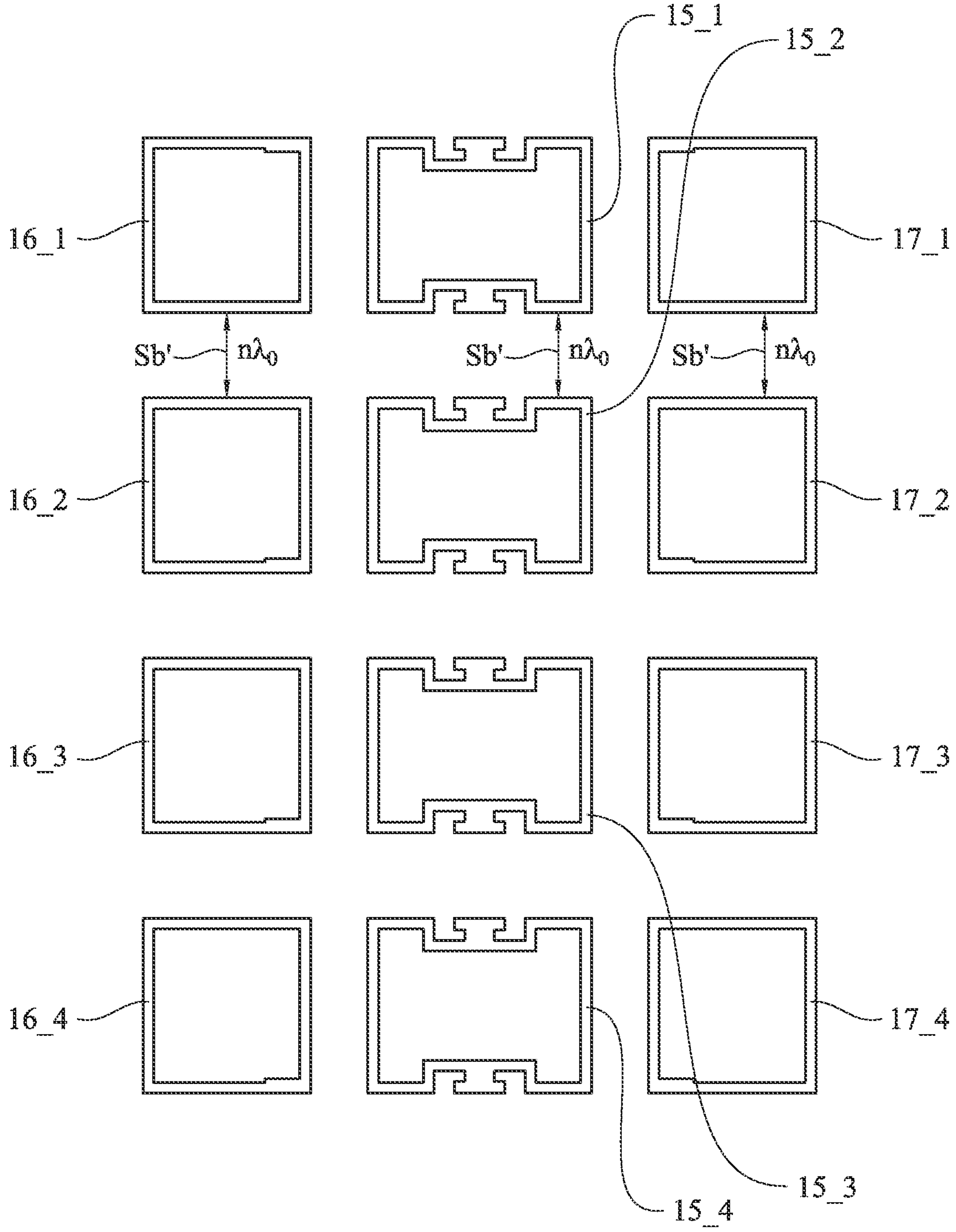
FIG. 7 is an enlarged schematic view of a second ring-shaped electrode, a third ring-shaped electrode, and a fourth ring-shaped electrode according to an embodiment of the present disclosure.

FIG. 6 is an enlarged schematic view of a microstrip line 68 and first ring-shaped electrodes 14_1~14_4 according to an embodiment of the present disclosure. FIG. 7 is an enlarged schematic view of second ring-shaped electrodes 15_1~15_4, third ring-shaped electrodes 16_1~16_4, and fourth ring-shaped electrodes 17_1~17_4 according to an embodiment of the present disclosure. The phase shifter 10 can include the microstrip line 68 and the first ring-shaped electrodes 14_1~14_4 in FIG. 6, and include the second ring-shaped electrodes 15_1~15_4, the third ring-shaped electrodes 16_1~16_4, and the fourth ring-shaped electrodes 17_1~17_4 in FIG. 7, that is the corresponding elements in FIG. 2 are replaced by elements in FIG. 6, and the corresponding elements in FIG. 3 are replaced by elements in FIG. 7. Since the embodiments in FIGS. 6 and 7 are respectively similar to the embodiments in FIGS. 2 and 3, only the differences will be described in detail below.

In the embodiment of FIG. 6, the microstrip line 68 further includes the plurality of sub-electrodes 63 arranged in sequence in the length direction DL, each of the sub-electrodes 63 is disposed between two adjacent ones of the first ring-shaped electrodes 14_1~14_4, and the plurality of sub-electrodes 63 are not electrically connected to the first ring-shaped electrodes 14_1~14_4 directly. Any two adjacent ones of the first ring-shaped electrodes 14_1~14_4 have a first distance Sa', and the first distance Sa' is substantially set to $n\lambda_0$. n is a value between 0 and 1, and $\lambda_0$ is the wavelength in a free space after the radio frequency signal on the microstrip line 68 is transmitted through the antenna electrode (such as the antenna electrode 95 in FIG. 9 described later). In some embodiments, the length of the sub-electrode 63 in the length direction DL is substantially set to $n\lambda_0$. In the embodiment shown in FIG. 7, any two adjacent ones of the second ring-shaped electrodes 15_1~15_4 have the second distance Sb', and any two adjacent ones of the third ring-shaped electrodes 16_1~16_4 have the second distance Sb', and any two adjacent ones of the fourth ring-shaped electrodes 17_1~17_4 have the second distance Sb'. In order to enable the vertical projection projected by the first ring-shaped electrodes 14_1~14_4 on the second substrate 12 are at least partially overlapped with the second ring-shaped electrodes 15_1~15_4 respectively, at least partially overlapped with third ring-shaped electrodes 16_1~16_4 respectively, at least partially overlapped with fourth ring-shaped electrodes 17_1~17_4 respectively, and the second distance Sb' is also substantially set to $n\lambda_0$.

The wider the first distance Sa' and the second distance Sb' are, the larger the impedance bandwidth of the antenna electrode (such as the antenna electrode 95 in FIG. 9) will be. In addition, each of the ring-shaped electrode receives a DC bias from a bias trace (not shown), and the wider the first distance Sa' are, the larger the second distance Sb' of the distance between the bias traces will be, thus, it is avoided that the bias traces affect the coupling effect between the ring-shaped electrodes.

It can be known from the above-mentioned embodiments that the first ring-shaped electrodes 14_1~14_4, the second ring-shaped electrodes 15_1~15_4, the third ring-shaped electrodes 16_1~16_4, and the fourth ring-shaped electrodes 17_1~17_4 can have the same number (such as four), but the number of the ring-shaped electrodes in FIG. 1~FIG. 7 is only an exemplary embodiment, the present disclosure is not limited to this. The number of the ring-shaped electrode can be adjusted according to the required phase offset. For convenience of description, an unspecified number of all first ring-shaped electrodes will be referred to below by reference numeral 14; an unspecified number of all second ring-shaped electrodes will be referred to below by reference numeral 15; an unspecified number of all third ring-shaped electrodes will be referred to below by reference numeral 16; and an unspecified number of all fourth ring-shaped electrodes will be referred to below by reference numeral 17.

In some embodiments, the number of each of the first ring-shaped electrodes 14, the second ring-shaped electrodes 15, the third ring-shaped electrodes 16, and the fourth ring-shaped electrodes 17 can be 2~7.

In some embodiments, the number of the sub-electrodes 23 in FIG. 5 can be adjusted with the number of the first ring-shaped electrodes 14. For example, when the number of the first ring-shaped electrodes 14 is 2, the number of the sub-electrode 23 is 1, that is the microstrip line 18 can include at least one sub-electrode 23.

In some embodiments, the shape of the first ring-shaped electrodes 14, the second ring-shaped electrodes 15, the third ring-shaped electrodes 16, and the fourth ring-shaped electrodes 17 can be circular or square rings.

In some embodiments, the third ring-shaped electrodes 16 and the fourth ring-shaped electrodes 17 can be omitted from the phase shifter 10.

Figure 8A:
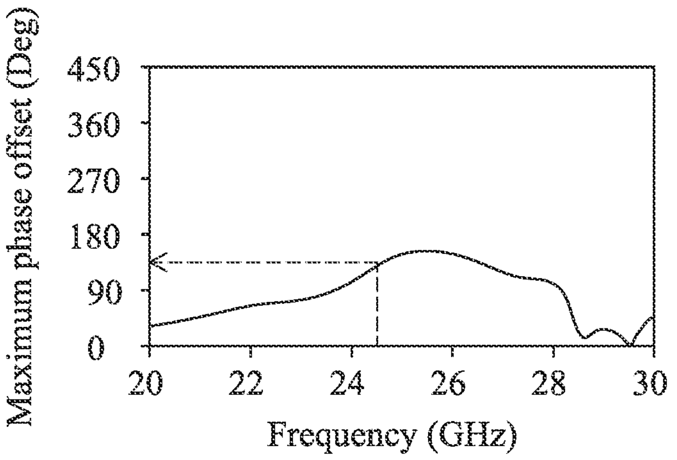
FIG. 8A is a schematic diagram of a maximum phase offset provided by a phase shifter according to some embodiments of the present disclosure.
Figure 8B:
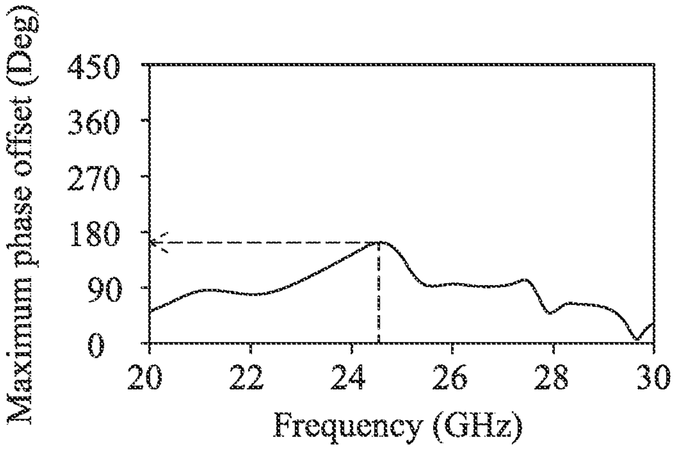
FIG. 8B is a schematic diagram of a maximum phase offset provided by a phase shifter according to some embodiments of the present disclosure.
Figure 8C:
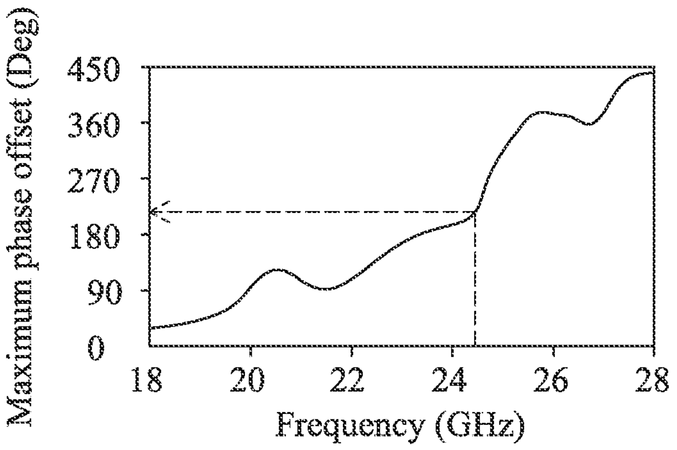
FIG. 8C is a schematic diagram of a maximum phase offset provided by a phase shifter according to some embodiments of the present disclosure.

FIGS. 8A-8C are schematic diagrams of a maximum phase offset provided by a phase shifter 10 according to some embodiments of the present disclosure. The maximum phase offset refers to the phase generated by the radio frequency signal passing through the phase shifter 10 with the smallest capacitance value and the phase shifter 10 with the largest capacitance value when the radio frequency signal has a specific operating frequency (such as 24.4 GHz). In the embodiment shown in FIGS. 8A-8C, the phase shifter 10 include the microstrip line 18 and the first ring-shaped electrodes 14 in FIG. 5, and include the second ring-shaped electrodes 15, the third ring-shaped electrodes 16, and the fourth ring-shaped electrodes 17 in FIG. 3.

In the embodiment of FIG. 8A, the number of each of the first ring-shaped electrodes 14, the second ring-shaped electrodes 15, the third ring-shaped electrodes 16, and the fourth ring-shaped electrodes 17 is 2, and the total length of these ring-shaped electrodes arranged in the length direction DL is about 2.2 mm (that is, the width LE (marked in FIG. 2) of each ring-shaped electrodes in the length direction DL is about 1.1 mm). At this time, the phase shifter 10 can generate a maximum phase shift of 135° for the phase of the radio frequency signal. In the embodiment shown in FIG. 8B, the number of each kind of ring-shaped electrodes is 3, and the total length of these ring-shaped electrodes arranged in the length direction DL is about 3.3 mm. At this time, the phase shifter 10 can generate a maximum phase shift of 170° for the phase of the radio frequency signal. In the embodiment shown in FIG. 8C, the number of each type of ring-shaped electrodes is 4, and the total length of these ring-shaped electrodes arranged in the length direction DL is about 4.4 mm. At this time, the phase shifter 10 can generate a maximum phase shift of 225° for the phase of the radio frequency signal.

In addition, according to the experimental results, when the number of each type of ring-shaped electrodes is 7, the phase shifter 10 can provide a maximum phase shift exceeding 360° (e.g., 395°). All in all, the advantage of the phase shifter 10 is that a wide range of phase shift can be generated for the radio frequency signal through a circuit layout with a small area.

Figure 9:
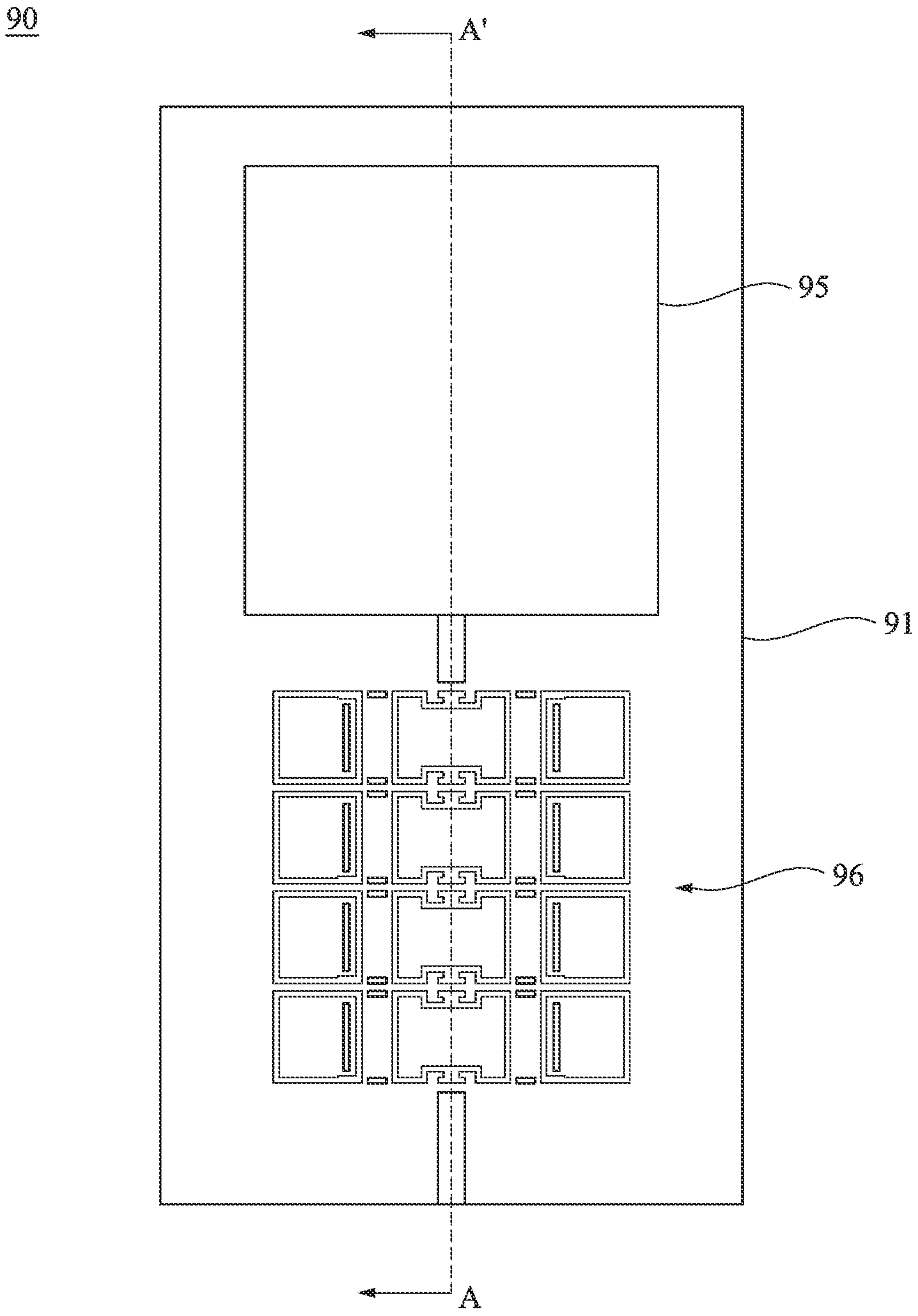
FIG. 9 is a schematic top view of an antenna circuit according to an embodiment of the present disclosure.
Figure 10:
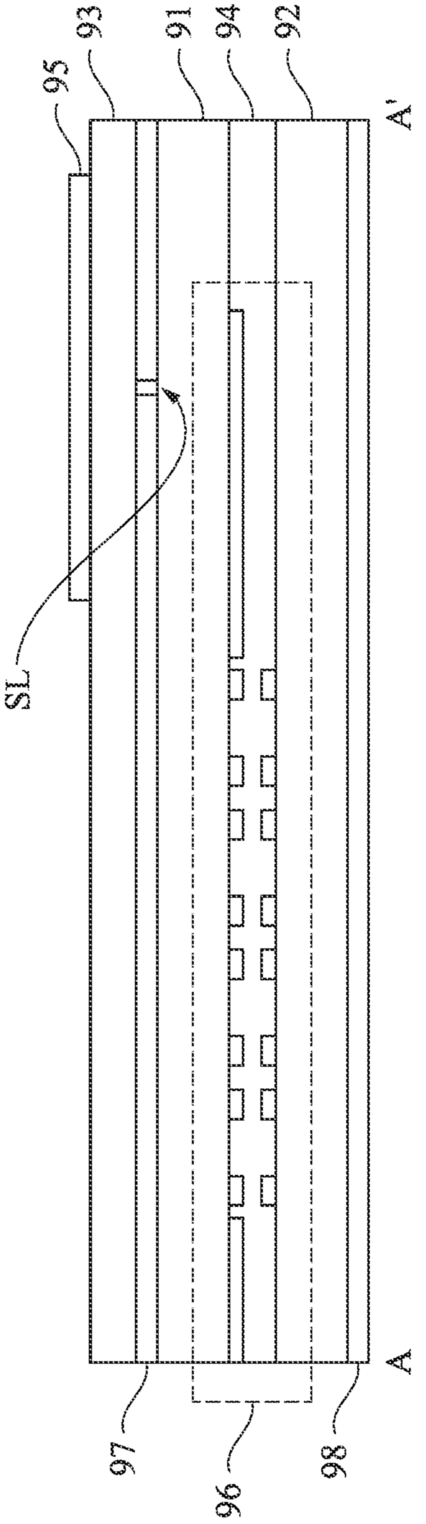
FIG. 10 is a schematic cross-sectional view along the line shown in FIG. 9.

FIG. 9 is a schematic top view of an antenna circuit 90 according to an embodiment of the present disclosure. FIG. 10 is a schematic cross-sectional view along the line AA' shown in FIG. 9. Please refer to FIG. 9 and FIG. 10 at the same time, the antenna circuit 90 includes a first substrate 91, a second substrate 92, a third substrate 93, a liquid crystal layer 94, an antenna electrode 95, a phase shifter 96, a first ground electrode 97, and a second ground electrode 98. In the top view of FIG. 9, the phase shifter 96 is covered by the first substrate 91. However, for the convenience of explaining the position of the phase shifter 96, the phase shifter 96 is shown as visible in FIG. 9.

In some embodiments, the phase shifter 96 can be implemented by the phase shifter 10 of any of the foregoing embodiments. At this time, the first substrate 91, the second substrate 92, the liquid crystal layer 94, the first ground electrode 97, and the second ground electrode 98 in FIG. 10 can be respectively used to form the first substrate 11, the second substrate 12, the liquid crystal layer 13, the first ground electrode 19, and the second ground electrode 20 of the phase shifter 10. In other words, the arrangement of the first substrate 91, the second substrate 92, the liquid crystal layer 94, the first ground electrode 97, and the second ground electrode 98 in FIG. 10 is similar to that of the first substrate 11, the second substrate 12, the liquid crystal layer 13, the first ground electrode 19, and the second ground electrode 20 in FIG. 1, therefore, the relevant content will not be repeated.

In this embodiment, the antenna electrode 95 is a patch antenna, but the present disclosure is not limited to this. In some embodiments, the antenna electrode 95 can also be implemented with other suitable types of antennas such as an inverted-F antenna or a microstrip antenna. The microstrip line of the phase shifter 96 extends below the antenna electrode 95 to feed the radio frequency signal into the antenna electrode 95. That is, when the phase shifter 96 is implemented by the phase shifter 10, the vertical projection projected by the antenna electrode 95 on the first substrate 91 is at least partially overlapped with the second conductive segment 22 of the phase shifter 10.

The first ground electrode 97 is disposed on a side of the first substrate 91 away from the liquid crystal layer 94, and is located between the antenna electrode 95 and the first substrate 91. The first ground electrode 97 includes a slot SL, in the case where the phase shifter 96 is implemented with the phase shifter 10, the vertical projection projected by the slot SL on the first substrate 91 will be at least partially overlapped with phase shifter 10 the second conductive segment 22. The slot SL is used to prevent the first ground electrode 97 from interfering with the coupling effect between the antenna electrode 95 and the microstrip line of the phase shifter 96. The third substrate 93 is disposed on a side of the first ground electrode 97 away from the first substrate 91, and the third substrate 93 is located between the antenna electrode 95 and the first ground electrode 97. In some embodiments, the third substrate 93 can be made of various suitable dielectric materials such as glass, ceramic or plastic materials.

All in all, the advantages of the antenna circuit 90 are that the circuit layout area is small, and the radio frequency signal it transmits can generate a wide range of phase shifts.

Figure 11:
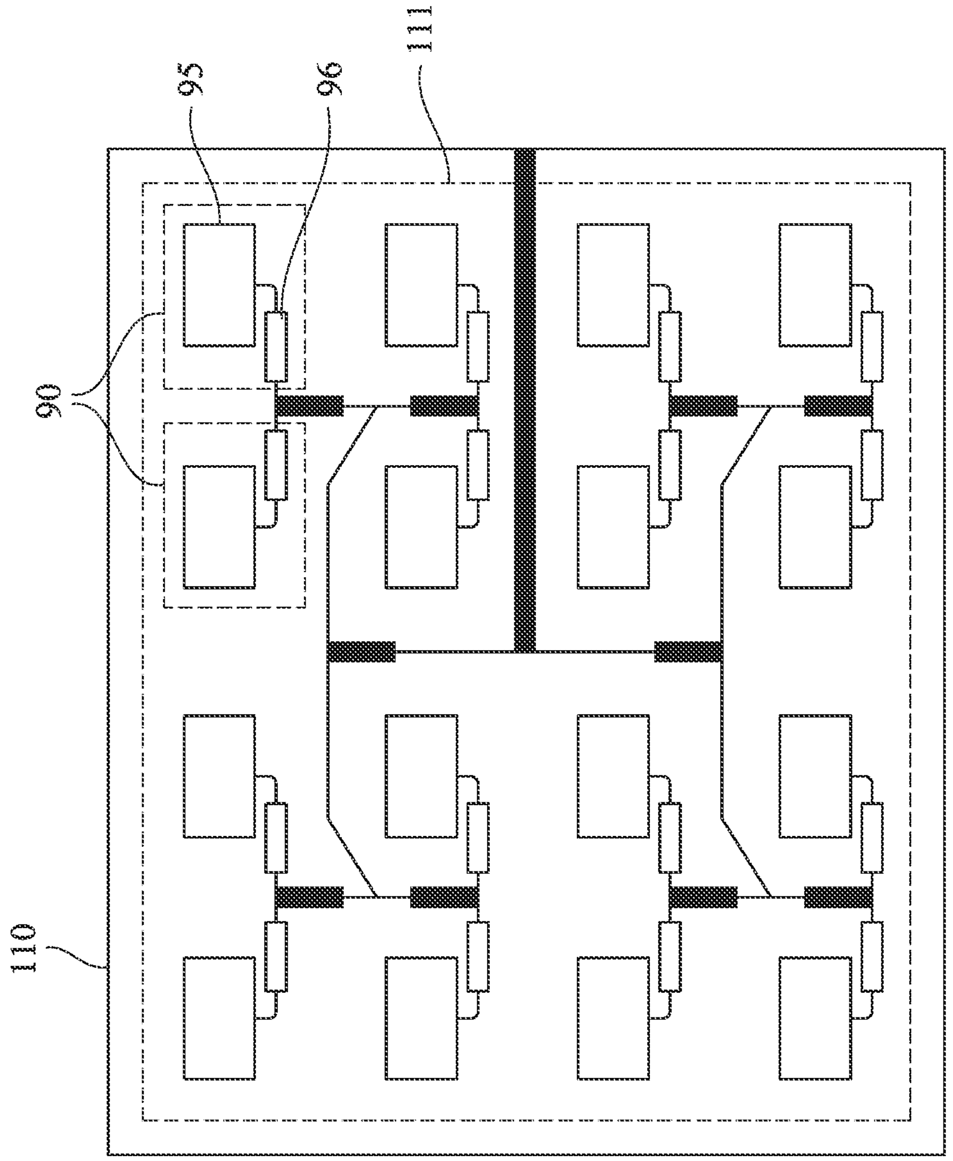
FIG. 11 is a schematic top view of an antenna device according to an embodiment of the present disclosure.

FIG. 11 is a schematic top view of an antenna device 110 according to an embodiment of the present disclosure. The antenna device 110 includes a plurality of antenna circuits 90 in FIG. 9, and the plurality of antenna circuits 90 are arranged in an antenna matrix 111 includes a plurality of rows and a plurality of columns. In other words, the antenna device 110 can include the aforementioned first substrate 91, the aforementioned second substrate 92, the aforementioned liquid crystal layer 94, the aforementioned first ground electrode 97, and the aforementioned second ground electrode 98. The plurality of antenna circuits 90 can receive the radio frequency signal from the same transmitter circuit (not shown), that is the microstrip line of plurality of phase shifters 96 can be coupled to each other. The DC bias of each of the phase shifter 96 can be independently controlled, so that the radio frequency signal transmitted by the plurality of antenna circuits 90 have different phase offsets, so that the antenna device 110 can be operated as a phased array antenna.

As can be seen from the above, the antenna device 110 is thin and light and has a wide scanning angle, so that the antenna device 110 is suitable for tracking the moving care object in the application situation of home care, so as to obtain the physiological information of the care object in real time (for example, calculating the respiratory rate by measuring the frequency of chest rise and fall).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A phase shifter, comprising:

a first substrate;

a second substrate, disposed opposite to the first substrate;

a liquid crystal layer, disposed between the first substrate and the second substrate;

a plurality of first ring-shaped electrodes, disposed sequentially and in interval on a side of the first substrate which is adjacent to the liquid crystal layer; and a plurality of second ring-shaped electrodes, disposed sequentially and in interval on a side of the second substrate which is adjacent to the liquid crystal layer, wherein a plurality of vertical projections projected by the plurality of first ring-shaped electrodes on the second substrate are at least partially overlapped with the plurality of second ring-shaped electrodes respectively.

2. The phase shifter of claim 1, further comprising:

a microstrip line, disposed on the side of the first substrate which is adjacent to the liquid crystal layer, wherein the microstrip line comprises a first conductive segment and a second conductive segment with a length direction, and the microstrip line is configured to transmit a radio frequency signal, wherein the plurality of first ring-shaped electrodes are sequentially arranged between the first conductive segment and the second conductive segment in the length direction, and the plurality of first ring-shaped electrodes are configured to transmit the radio frequency signal from the first conductive segment to the second conductive segment under a condition that the plurality of first ring-shaped electrodes are DC isolation from the first conductive segment and the second conductive segment.

3. The phase shifter of claim 2, wherein the microstrip line further comprises at least one sub-electrode sequentially arranged in the length direction, wherein each of the at least one sub-electrodes is disposed between two adjacent ones of the plurality of first ring-shaped electrodes, and the at least one sub-electrode is DC insulated from the plurality of first ring-shaped electrodes.

4. The phase shifter of claim 2, wherein two adjacent ones of the plurality of first ring-shaped electrodes have a first distance, and the first distance is substantially nλ0, n is a value between 0 and 1, and λ0 is a wavelength of the radio frequency signal in a free space.

5. The phase shifter of claim 2, further comprising a plurality of third ring electrodes and a plurality of fourth ring electrodes, wherein the plurality of third ring electrodes and the plurality of fourth ring electrodes are disposed on a side of the second substrate which is adjacent to the liquid crystal layer, the plurality of third ring electrodes are respectively disposed on a first side of the plurality of second ring-shaped electrodes, and the plurality of fourth ring electrodes are respectively disposed on a second side of the plurality of second ring-shaped electrodes which is opposite to the first side, wherein the plurality of vertical projections projected by the plurality of first ring-shaped electrodes on the second substrate are at least partially overlapped with the plurality of third ring electrodes respectively, and at least partially overlapped with the plurality of fourth ring electrodes respectively.

6. The phase shifter of claim 5, wherein two adjacent ones of the plurality of second ring-shaped electrodes have a second distance, two adjacent ones of the plurality of third ring electrodes have the second distance, and two adjacent ones of the plurality of fourth ring electrodes have the second distance, wherein the second distance is substantially nλ0, n is a value between 0 and 1, and λ0 is a wavelength of the radio frequency signal in a free space.

7. The phase shifter of claim 1, further comprising:

a first ground electrode, disposed on a side of the first substrate which is away from the liquid crystal layer; and a second ground electrode, disposed on a side of the second substrate which is away from the liquid crystal layer.

8. The phase shifter of claim 1, wherein the plurality of first ring-shaped electrodes and the plurality of second ring-shaped electrodes are circular or square rings.

9. An antenna circuit, comprising:

an antenna electrode;

a first substrate;

a second substrate, disposed opposite to the first substrate;

a liquid crystal layer, disposed between the first substrate and the second substrate; and a phase shifter, configured to feed a radio frequency signal into the antenna electrode, and comprising:

a plurality of first ring-shaped electrodes, disposed sequentially and in interval on a side of the first substrate which is adjacent to the liquid crystal layer; and a plurality of second ring-shaped electrodes, disposed sequentially and in interval on a side of the second substrate which is adjacent to the liquid crystal layer, wherein a plurality of vertical projections projected by the plurality of first ring-shaped electrodes on the second substrate are at least partially overlapped with the plurality of second ring-shaped electrodes respectively.

10. The antenna circuit of claim 9, wherein the phase shifter further comprises:

a microstrip line, disposed on the side of the first substrate which is adjacent to the liquid crystal layer, and comprising a first conductive segment and a second conductive segment with a length direction, and the microstrip line is configured to transmit the radio frequency signal, wherein a vertical projection of the antenna electrode on the first substrate are at least partially overlapped with the second conductive segment, wherein the plurality of first ring-shaped electrodes are sequentially arranged between the first conductive segment and the second conductive segment in the length direction, and the plurality of first ring-shaped electrodes are configured to transmit the radio frequency signal from the first conductive segment to the second conductive segment under a condition that the plurality of first ring-shaped electrodes are DC isolation from the first conductive segment and the second conductive segment.

11. The antenna circuit of claim 10, wherein the microstrip line further comprises at least one sub-electrode sequentially arranged in the length direction, wherein each of the at least one sub-electrodes is disposed between two adjacent ones of the plurality of first ring-shaped electrodes, and the at least one sub-electrode is DC insulated from the plurality of first ring-shaped electrodes.

12. The antenna circuit of claim 10, wherein two adjacent ones of the plurality of first ring-shaped electrodes have a first distance, and the first distance is substantially $n\lambda 0$, n is a value between 0 and 1, and $\lambda 0$ is a wavelength of the radio frequency signal in a free space.

13. The antenna circuit of claim 10, wherein the phase shifter further comprises a plurality of third ring electrodes and a plurality of fourth ring electrodes, wherein the plurality of third ring electrodes and the plurality of fourth ring electrodes are disposed on a side of the second substrate which is adjacent to the liquid crystal layer, the plurality of third ring electrodes are respectively disposed on a first side of the plurality of second ring-shaped electrodes, and the plurality of fourth ring electrodes are respectively disposed on a second side of the plurality of second ring-shaped electrodes which is opposite to the first side, wherein the plurality of vertical projections projected by the plurality of first ring-shaped electrodes on the second substrate are at least partially overlapped with the plurality of third ring electrodes respectively, and at least partially overlapped with the plurality of fourth ring electrodes respectively.

14. The antenna circuit of claim 13, wherein two adjacent ones of the plurality of second ring-shaped electrodes have a second distance, two adjacent ones of the plurality of third ring electrodes have the second distance, and two adjacent ones of the plurality of fourth ring electrodes have the second distance, wherein the second distance is substantially $n\lambda 0$, n is a value between 0 and 1, and $\lambda 0$ is a wavelength of the radio frequency signal in a free space.

15. The antenna circuit of claim 9, further comprising:

a first ground electrode, disposed on a side of the first substrate which is away from the liquid crystal layer, and between the antenna electrode and the first substrate; and a second ground electrode, disposed on a side of the second substrate which is away from the liquid crystal layer.

16. The antenna circuit of claim 9, wherein the plurality of first ring-shaped electrodes and the plurality of second ring-shaped electrodes are circular or square rings.

17. An antenna device, comprising:

a first substrate;

a second substrate, disposed opposite to the first substrate;

a liquid crystal layer, disposed between the first substrate and the second substrate; and a plurality of antenna circuits, arranged in an antenna matrix having a plurality of rows and a plurality of columns, wherein each of the antenna circuit comprises:

an antenna electrode; and a phase shifter, configured to feed a radio frequency signal into the antenna electrode, and comprising:

a plurality of first ring-shaped electrodes, disposed sequentially and in interval on a side of the first substrate which is adjacent to the liquid crystal layer; and a plurality of second ring-shaped electrodes, disposed sequentially and in interval on a side of the second substrate which is adjacent to the liquid crystal layer, wherein a plurality of vertical projections projected by the plurality of first ring-shaped electrodes on the second substrate are at least partially overlapped with the plurality of second ring-shaped electrodes respectively.

18. The antenna device of claim 17, wherein the phase shifter further comprises:

a microstrip line, disposed on the side of the first substrate which is adjacent to the liquid crystal layer, and comprising a first conductive segment and a second conductive segment with a length direction, and the microstrip line being configured to transmit the radio frequency signal, wherein a vertical projection of the antenna electrode on the first substrate are at least partially overlapped with the second conductive segment, wherein the plurality of first ring-shaped electrodes are sequentially arranged between the first conductive segment and the second conductive segment in the length direction, and the plurality of first ring-shaped electrodes are configured to transmit the radio frequency signal from the first conductive segment to the second conductive segment under a condition that the plurality of first ring-shaped electrodes are DC isolation from the first conductive segment and the second conductive segment.

19. The antenna device of claim 18, wherein the microstrip line further comprises a plurality of sub-electrode sequentially arranged in the length direction, wherein each of the plurality of sub-electrodes is disposed between two adjacent ones of the plurality of first ring-shaped electrodes, and the at least one sub-electrode is DC insulated from the plurality of first ring-shaped electrodes.

20. The antenna device of claim 18, wherein the phase shifter further comprises a plurality of third ring electrodes and a plurality of fourth ring electrodes, wherein the plurality of third ring electrodes and the plurality of fourth ring electrodes are disposed on a side of the second substrate which is adjacent to the liquid crystal layer, the plurality of third ring electrodes are respectively disposed on a first side of the plurality of second ring-shaped electrodes, and the plurality of fourth ring electrodes are respectively disposed on a second side of the plurality of second ring-shaped electrodes which is opposite to the first side, wherein the plurality of vertical projections projected by the plurality of first ring-shaped electrodes on the second substrate are at least partially overlapped with the plurality of third ring electrodes respectively, and at least partially overlapped with the plurality of fourth ring electrodes respectively.

* * * * *